US 9,842,355 B2

(12) United States Patent
Weiss

(10) Patent No.: US 9,842,355 B2
(45) Date of Patent: Dec. 12, 2017

(54) BILLER-INITIATED ELECTRONIC BILLING ACTIVATION

(71) Applicant: FISERV, INC., Brookfield, WI (US)

(72) Inventor: Todd A. Weiss, Atlanta, GA (US)

(73) Assignee: FISERV, INC., Brookfield, WI (US)

( * ) Notice: Subject to any disclaimer, the term of this patent is extended or adjusted under 35 U.S.C. 154(b) by 0 days.

(21) Appl. No.: 14/686,662

(22) Filed: Apr. 14, 2015

(65) Prior Publication Data
US 2015/0221003 A1    Aug. 6, 2015

Related U.S. Application Data

(63) Continuation of application No. 13/955,867, filed on Jul. 31, 2013, now abandoned.

(51) Int. Cl.
*G06Q 40/00* (2012.01)
*G06Q 30/04* (2012.01)
*G06Q 20/10* (2012.01)
*G06Q 20/14* (2012.01)

(52) U.S. Cl.
CPC ........... *G06Q 30/04* (2013.01); *G06Q 20/102* (2013.01); *G06Q 20/14* (2013.01)

(58) Field of Classification Search
USPC ...... 705/30, 45, 37, 39, 41, 38, 40; 235/379, 235/380; 709/229; 719/318, 313; 382/137
See application file for complete search history.

(56) References Cited

U.S. PATENT DOCUMENTS

| | | | | |
|---|---|---|---|---|
| 6,289,322 B1 * | 9/2001 | Kitchen | ............... | G06Q 20/04 705/34 |
| 7,395,243 B1 | 7/2008 | Zielke | | |
| 7,848,972 B1 | 12/2010 | Sharma | | |
| 7,930,248 B1 | 4/2011 | Lawson | | |
| 8,630,947 B1 * | 1/2014 | Freund | ............... | G06Q 10/109 705/40 |
| 8,805,739 B2 * | 8/2014 | Brown | ............... | G06Q 20/102 705/38 |
| 2002/0023055 A1 * | 2/2002 | Antognini | ............ | G06K 1/121 705/40 |
| 2003/0191711 A1 * | 10/2003 | Jamison | ............... | G06Q 20/04 705/40 |
| 2004/0049456 A1 | 3/2004 | Dreyer | | |
| 2004/0088237 A1 | 5/2004 | Moenickheim | | |
| 2004/0254866 A1 * | 12/2004 | Crumbach | .......... | G06Q 20/102 705/34 |
| 2006/0080243 A1 * | 4/2006 | Kemper | ............. | G06Q 20/102 705/40 |

(Continued)

Primary Examiner — Tien Nguyen
(74) Attorney, Agent, or Firm — Alston & Bird LLP

(57) ABSTRACT

This disclosure describes systems, methods, and computer-readable media related to biller-initiated electronic billing activation. A biller system associated with a biller may receive entity information associated with an entity requesting to establish a biller account with the biller. The biller system may generate the biller account. The biller system may generate an electronic billing activation request. The biller system may transmit to a service provider system associated with an electronic bill presentment and payment (EBPP) service provider, the electronic billing activation request and receive a confirmation of processing of the electronic billing activation request.

18 Claims, 6 Drawing Sheets

(56) References Cited

U.S. PATENT DOCUMENTS

| | | | | |
|---|---|---|---|---|
| 2006/0173779 A1* | 8/2006 | Bennett | G06Q 20/10 705/40 |
| 2008/0010204 A1* | 1/2008 | Rackley, III | G06Q 20/042 705/45 |
| 2008/0288376 A1* | 11/2008 | Panthaki | G06Q 20/102 705/30 |
| 2012/0136780 A1* | 5/2012 | El-Awady | G06Q 20/14 705/40 |

* cited by examiner

BILLER-INITIATED ELECTRONIC BILLING ACTIVATION

CROSS-REFERENCE TO RELATED APPLICATION(S)

This application is a continuation of U.S. application Ser. No. 13/955,867, filed Jul. 13, 2013, the content of which is incorporated by reference herein in its entirety.

BACKGROUND

Financial service providers may provide any of a variety of financial services electronically, such as over the Internet. For example, financial service providers may provide electronic bill presentment and payment (EBPP) services including, among other things, the electronic presentation of consumer and business bills and/or the capability to submit electronic bill payments. Financial service providers may offer such services directly, indirectly, or on behalf of another entity. Financial service providers may directly offer services by interacting directly with the consumer/business or biller. Financial service providers may indirectly offer services by interacting with the consumer/business through another entity that may present a user interface to the consumer/business or with the biller through another entity that services the biller (e.g., biller service provider). In some embodiments, financial service providers may offer services on behalf of another entity where the customer of the financial service provider is an entity, such as a bank, that offers EBPP services to its customers but the financial service provider interacts with the customers of entity.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope or applicability of the disclosure. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
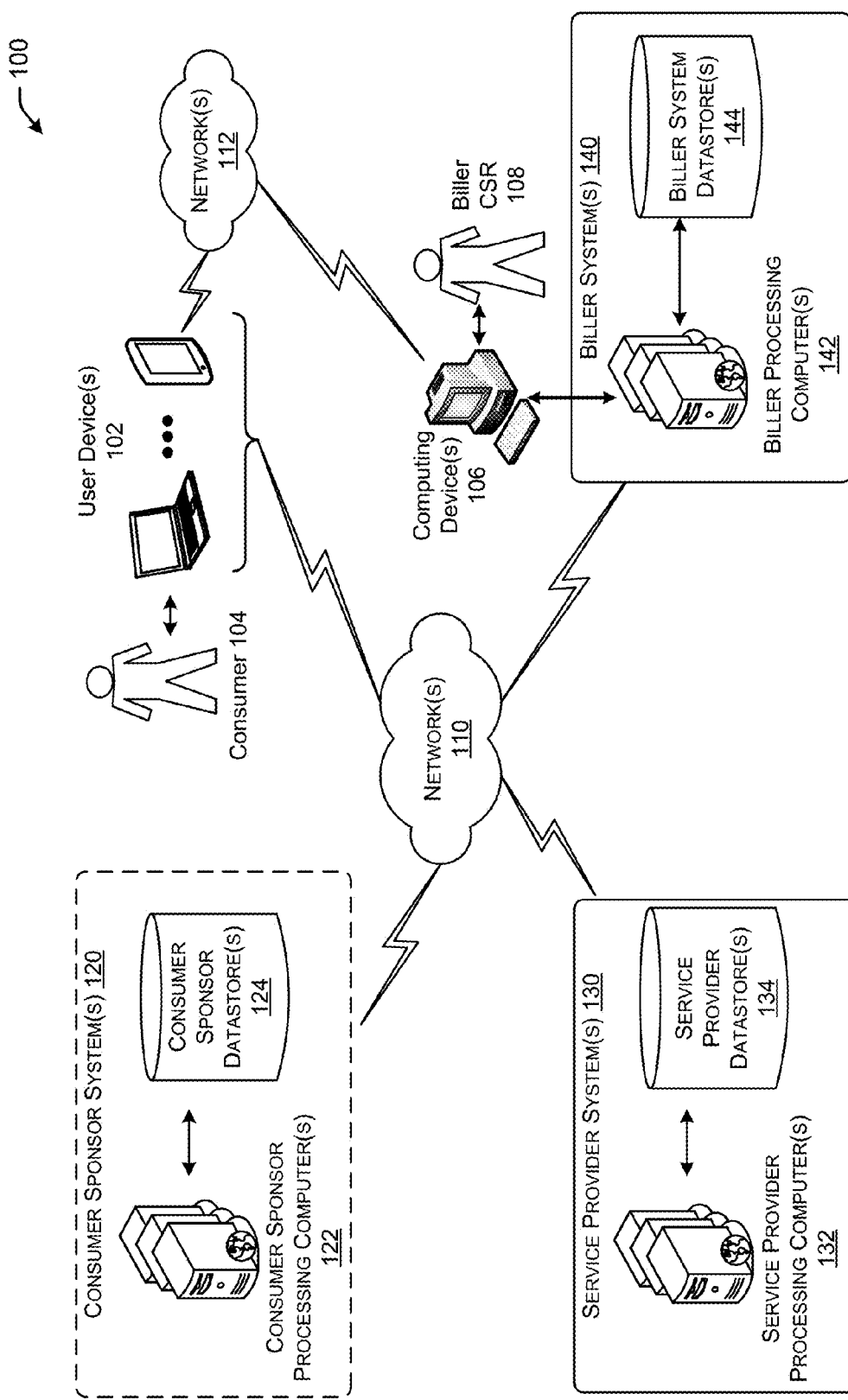
FIG. 1 is a schematic block diagram of an illustrative system for biller-initiated electronic billing activation in accordance with an embodiment of the disclosure.

Systems, methods, and computer-readable media in accordance with various embodiments of the present disclosure relate to, among other things, biller-initiated electronic billing activation. In some embodiments, a service provider system may provide electronic bill presentment and payment (EBPP) services. A consumer may be any type of entity capable of establishing biller accounts and using EBPP services. A consumer may be an individual or a business ranging in size from small merchants to large organizations. A biller may be any type of entity that may bill a consumer for services rendered or goods sold. For example, a biller may be a utility company (e.g., electric company, gas company, water/sewer company, telecommunications company, or the like); a lender; a credit card issuer; an insurance company; a healthcare provider; or any other type of service provider (e.g., security service, maid service, laundry service, landscape service, or the like).

In accordance with one or more example embodiments of the disclosure, a service provider system may establish a subscriber account for a consumer, generate a unique consumer identifier, and associate the unique consumer identifier with the subscriber account (and by extension, the consumer). The service provider system may transmit the unique consumer identifier for presentation to the consumer. The consumer may contact a biller to request service to be established. The biller may receive the unique consumer identifier from the consumer, as well as other information, and may establish a new biller account associated with the consumer. The biller may obtain additional information from the consumer, such as contact information and preferences regarding electronic billing and automatic bill payment services. In some embodiments, the unique consumer identifier may not be provided to the biller under preferences regarding the EBPP services are provided. The consumer may provide a variety of information to establish a new account with the biller and the biller may request preferences associated with electronic bill payment and presentment. The consumer may transmit an indication to receive bills electronically and provide the consumer identifier. The biller may then generate an electronic billing activation request, which may include the unique consumer identifier as well as other information, and transmit the request to the service provider system that provides the EBPP services and is associated with the unique consumer identifier—in case the biller may work with more than one EBPP service provider. The service provider system may verify the identity of the consumer and identify the subscriber account associated with the consumer based at least in part on the unique consumer identifier. The service provider system may then proceed to activate electronic billing by establishing the biller as a new payee of the consumer, establishing the biller as an electronic biller of the consumer, and optionally setting up automatic payment of future bills of the biller for the consumer.

Illustrative System

FIG. 1 schematically depicts an illustrative networked architecture 100 that facilitates biller-initiated electronic billing activation in accordance with one or more embodiments of the disclosure. The illustrative architecture 100 may include one or more user devices 102 operable by one or more consumers 104, one or more service provider system(s) 130, and one or more biller system(s) 140. The illustrative architecture may further optionally include one or more consumer sponsor system(s) 120. It should be appreciated that while one or more components of the illustrative architecture 100 may be described in the singular, a plural number of any such component(s) (potentially forming part of a system that includes additional hardware, software, firmware, and/or networking components) is also encompassed by this disclosure.

The user device(s) 102 may be communicatively coupled with the service provider system(s) 130, biller system(s) 140, and/or the optional consumer sponsor system(s) 120 via one or more networks 110. The network(s) 110 may include, but are not limited to, any one or a combination of different types of suitable communications networks, such as cable networks, wireless networks, cellular networks, or any other private (e.g., frame relay networks) and/or public networks (e.g., the Internet) including networks of any scope of coverage such as metropolitan-area networks (MANs), wide-area networks (WANs), local area networks (LANs), and so forth. Further, the network(s) 110 may include any suitable data transmission medium including, but not limited to, coaxial cable, twisted wire pair, optical fiber, hybrid fiber coaxial (HFC), microwave terrestrial transceivers, radio frequency communication mediums, satellite communication mediums, or combinations thereof.

A consumer 104 may operate a user device 102 to establish service or enroll with an EBPP service provider that may host, operate, control, or otherwise be associated with the service provider system 130. The consumer 104 may be an individual person or a business entity requesting EBPP services from a service provider, which may be provided via, for example, the service provider system 130. In some embodiments, the consumer 104 may request the EBPP services via a consumer sponsor system 120. The service provider system 130 may receive a request from the consumer 104 either directly or through a consumer sponsor system 120. Responsive to the request, the service provider system 130 may enroll the consumer 104 for EBPP services by establishing a subscriber account and associating the consumer 104 with the subscriber account. The service provider system 130 may generate a unique consumer identifier and associate the identifier with the subscriber account and thus, by extension, with the consumer 104. The unique consumer identifier may be unique across the scope of all subscriber accounts serviced by the service provider system 130.

The user device(s) 102 may include any suitable computing device including, but not limited to, for example, a laptop computer, desktop computer, smartphone device, a tablet device, or the like. The user device(s) 102 may be associated with any suitable operating system/computing environment. While various embodiments of the disclosure may be described in the context of mobile computing devices and mobile applications, it should be appreciated that the disclosure extends to any suitable computing device (e.g., a desktop computer, a laptop computer, a workstation, etc.) capable of executing any suitable client application within any suitable computing environment.

In one or more embodiments of the disclosure, the user device(s) 102 may be associated with one or more operating system environments. Any of a variety of applications may be executable on the user device(s) 102.

A consumer 104 may use a user device 102 to perform a variety of different functions and access a variety of different Web pages and services, which may include EBPP services supported by the service provider system 130. As previously noted, EBPP services supported by the service provider system 130 may be accessed through a consumer sponsor system 120.

The consumer sponsor system(s) 120 may include one or more consumer sponsor processing computer(s) 122 and one or more consumer sponsor datastore(s) 124. A consumer sponsor may be an entity that provides consumers 104 with an access point to EBPP services supported by, for example, service provider system 130. In some embodiments, user interfaces for EBPP services may be hosted by either the consumer sponsor system 120 or the service provider system 130. In some embodiments, the user interfaces (UIs) may be hosted by the service provider system 130 but branded to reflect the consumer sponsor. In some embodiments, the branding may be done by the service provider system 130 so that the service provider remains anonymous to the consumer 104. The consumer sponsor may be a financial institution that provides a Web portal, or some other entity. The consumer sponsor may provide information about the consumer 104 to the service provider system 130 in support of enrollment (e.g., either "pre-enrolling" the consumer 104 or providing the information as the consumer 104 initiates an enrollment process).

A consumer sponsor system 120 may include one or more consumer sponsor datastores 124. The consumer sponsor datastores 124 may store data associated with a consumer 104 used to populate sponsor-provided enrollment in EBPP services, such as consumer information (e.g., name, address, telephone number, email address, etc.), an identifier by which a consumer 104 may be identified by the consumer sponsor, and/or one or more financial account number(s) associated with the consumer 104.

The consumer 104 may communicate with the service provider system 130 through the consumer sponsor system 120 or directly. The service provider system 130 may include one or more service provider processing computers 132. The service provider system 130 may support a variety of functionality including supporting a network of multiple consumer sponsors, consumers 104, and billers. The one or more service provider processing computers 132 may support electronic bill presentment and payment functionality. For example, electronic bill presentment and payment functionality may include, but is not limited to, consumer enrollment processing, generation and tracking of unique consumer identifiers, notifications to consumers 104 and billers regarding electronic bill payment, processing of biller-initiated electronic billing activation requests on behalf of consumers 104, including presentment of bill information electronically, payment of the biller on behalf of the consumer, establishment of the biller as a payee and an electronic biller of the consumer 104, and transmission of a subsequent notification to the consumer 104 and a confirmation to the biller, and the like.

In addition, the service provider processing computers 132 may store or may be configured to access one or more datastore(s) (e.g., service provider datastores 134) storing a variety of types of information including, but not limited to, data associated with consumers 104, consumer sponsors, and billers to enable EBPP services. For example, the service provider datastores 134 may store consumer information, such as names, addresses, telephone numbers, email addresses, and the like. The service provider datastores 134 may store the unique consumer identifiers associated with various subscriber accounts in turn associated with respective consumers 104. The service provider datastores 134 may store a variety of data associated with individual subscriber accounts (and thus consumers 103) or individual billers, or both. For example, the service provider datastores 134 may store a variety of data for each of a number of respective payees associated with a subscriber account, such as an electronic billing activation status or a biller account number.

After a subscriber account has been established by the service provider system 130 and a unique consumer identifier is transmitted for presentation to the consumer 104, the consumer 104 may communicate with a biller over a network 110 or 112. The network(s) 110 or 112 may include, but are not limited to, any one or a combination of different types of suitable communications networks, such as cable networks, wireless networks, cellular networks, or any other private (e.g., frame relay networks) and/or public networks (e.g., the Internet) including networks of any scope of coverage such as metropolitan-area networks (MANs), wide-area networks (WANs), local area networks (LANs), and so forth. Further, the network(s) 110 or 112 may include any suitable data transmission medium including, but not limited to, coaxial cable, twisted wire pair, optical fiber, hybrid fiber coaxial (HFC), microwave terrestrial transceivers, radio frequency communication mediums, satellite communication mediums, or combinations thereof.

For example, the consumer 104 may use a telephone to communicate with a biller customer service representative (CSR) 108 or similar employee of the biller to activate service with the biller and establish a new biller account. The biller CSR 108 may request information from the consumer 104 to create a new biller account for the customer. A biller CSR 108 may support consumers in establishing services provided by the biller and creating new biller accounts or other functions and interactions with consumers 104. Each biller may have multiple biller CSRs 108 performing this function. The biller CSR 108 may use a computing device 106 to interact with the biller system 140. For example, the biller CSR 108 may obtain information from a consumer 104 and enter the information into the system through a computing device 106.

The biller CSR 108 may initiate processing responsive to a request from the consumer 104 to establish services provided by the biller and create a new biller account. One or more computing devices 106 may interact with one or more biller processing computers 142 to store and/or access data and initiate appropriate processing. The biller system 140 may be accessed and utilized by biller CSRs 108 via one or more computing devices 106. The biller system 140 may support electronic billing through the EBPP service provider associated with service provider system 130. The biller system 140 may further support biller-initiated electronic billing activation. A new biller account may be generated by the biller system 140, and a biller-initiated electronic billing activation request may be generated based at least in part on the new biller account and the unique consumer identifier and transmitted to the service provider system 130.

The biller processing computers 142 of the biller system 140 may store or may be configured to access one or more datastore(s) (e.g., biller system datastores 144) storing a variety of types of information including, but not limited to, information associated with consumers 104, information associated with biller accounts that have been established, and associated service parameters (e.g., electronic billing activation status, automatic bill payment instructions and parameters, such as amount, timing of payments, duration of payments, etc.). For example, data that is stored in the biller system datastores 144 may include data relating to a start date for services provided by the biller to a consumer, data relating to the biller account (e.g., date of creation, services added and/or modified over the life of service to the consumer 104), unique customer identifiers associated with consumers 104, and the like. Consumer information may include name, address, telephone number, email address, or the like. Biller account numbers associated with the consumer 104 may include electronic billing activation status for each biller account. An account identifier associated with the EBPP service or the unique consumer identifier may be provided by the service provider system 130.

In some embodiments, the illustrative architecture 100 may optionally include a biller service provider (BSP) system. The BSP system may be in communication with one or more biller system(s) 140 and provide services on behalf of the biller system 140. For example, a BSP may support the CSR functionality or handle communication flows to/from the service provider system(s) 130.

It should be appreciated that individual instances of the service provider system(s) 130, the biller system(s) 140, or the consumer sponsor system(s) 120 may each be hosted or controlled by one or more entities including potentially one or more same entities. Further, in those scenarios in which any of the components of the illustrative architecture depicted in FIG. 1 are hosted by a same entity, the components may be provided at different locations.

Those of ordinary skill in the art will appreciate that the illustrative networked architecture 100 depicted in FIG. 1 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 100 depicted in FIG. 1, or additional functionality.

Figure 2:
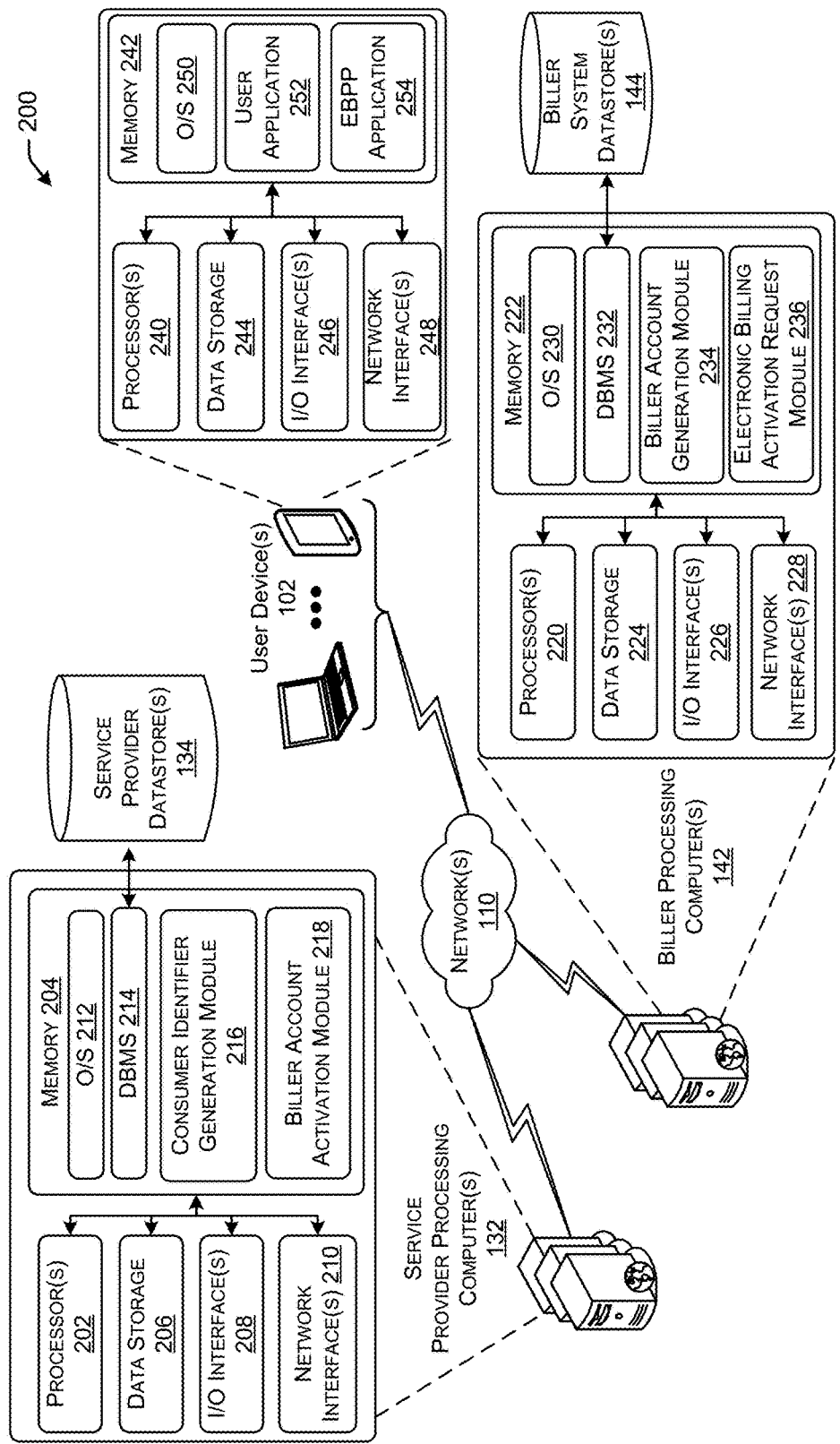
FIG. 2 is a more detailed schematic block diagram illustrating various hardware and software sub-components of various components of the illustrative architecture of FIG. 1 in accordance with an embodiment of the disclosure.

FIG. 2 is a more detailed schematic block diagram illustrating various hardware and software sub-components of various components of the illustrative architecture of FIG. 1 in accordance with one or more embodiments of the disclosure.

As depicted in FIG. 2, an illustrative user device 102 in accordance with one or more embodiments of the disclosure may include one or more memory devices 242 (generically referred to herein as memory 242) and one or more processors (processor(s)) 240 configured to execute computer-executable instructions that may be stored in the memory 242. In some embodiments, the user device 102 may include one or more buses to facilitate transfers of data between components inside a computer (e.g., between memory devices 242, processors 240, and the like). The one or more buses may be parallel buses or serial buses. As previously noted, the user device 102 may be any suitable computing device including, but not limited to, a server computing device, a desktop computing device, a laptop computing device, a mobile computing device, a mainframe computing device, and so forth.

The processor(s) 240 may include any suitable processing unit capable of accepting digital data as input, processing the input data in accordance with stored computer-executable instructions, and generating output data. The processor(s) 240 may be configured to execute the computer-executable instructions to cause or facilitate the performance of various operations. The processor(s) 240 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 242 may store computer-executable instructions that are loadable and executable by the processor(s) 240 as well as data manipulated and/or generated by the processor(s) 240 during the execution of the computer-executable instructions. The memory 242 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 242 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The user device 102 may further include additional data storage 244 such as removable storage and/or non-removable storage including, but not limited to, magnetic storage, optical disk storage, and/or tape storage. Data storage 244 may provide storage of computer-executable instructions and/or other data. The data storage 244 may include storage that is internal and/or external to the user device 102. The memory 242 and/or the data storage 244, removable and/or non-removable, are all examples of computer-readable storage media (CRSM).

The memory 242 may store data, computer-executable instructions, applications, and/or various program modules including, for example, one or more operating systems 250, one or more user applications 252, and/or one or more EBPP applications 254.

The operating system (O/S) 250 may provide an interface between other application software executing on the user device 102 (e.g., the user applications 252) and hardware resources of the user device 102. More specifically, the O/S 250 may include a set of computer-executable instructions for managing hardware resources of the user device 102 and for providing common services to other applications (e.g., managing memory allocation among various applications). The O/S 250 may include any operating system now known or which may be developed in the future including, but not limited to, any mobile operating system, any desktop or laptop operating system, any mainframe or server operating system, or any other proprietary or freely available operating system. In some embodiments, O/S 250 may include third party toolkits, middleware, and other supporting infrastructural software.

The memory 242 may further include one or more user applications 252 loaded therein. A user application 252 may include one or more program modules comprising computer-executable instructions that when executed by the processor(s) 240 enable different types of functionality, such as communicating through email, text message, video chatting, or the like. In some embodiments, the user application 252 may receive or otherwise obtain information for the EBPP application 254 for storage or presentment. For example, the user application 252 may be a budgeting application that may utilize the information that may be available through the EBPP application 254.

The memory 242 may further include one or more EBPP applications 254 loaded therein. An EBPP application 252 may include one or more program modules comprising computer-executable instructions that when executed by the processor(s) 240 cause various aspects of electronic bill presentment and payment functionality to be performed in accordance with one or more embodiments of the disclosure. For example, the EBPP application 252 may communicate with the service provider system 130 and may obtain and/or store a unique consumer identifier in data storage 244.

The user device 102 may further include one or more I/O interfaces 246 that facilitate receipt, by the user device 102, of information input via one or more I/O devices associated with the user device 102 as well as the outputting of information from the user device 102 to the one or more I/O devices for presentation to a consumer 104. The I/O devices may include, for example, one or more user interface devices that facilitate interaction between a consumer 104 and the user device 102 including, but not limited to, a display, a keypad, a keyboard, a pointing device, a control panel, a touch screen display, a remote control device, a speaker, a microphone, and so forth.

The user device 102 may further include network interface(s) 248 that facilitate communication between the user device 102 and other devices of the illustrative system architecture 100 (e.g., the service provider system 130, consumer sponsor system 120, and/or biller system 140) or application software via the network(s) 110.

The user device 102 may communicate over one or more networks 110 with a service provider processing computer 132, a biller processing computer 142, and/or a consumer sponsor processing computer 122.

FIG. 2 additionally depicts various illustrative software, hardware, and/or firmware components of an illustrative service provider processing computer 132 in accordance with one or more embodiments of the disclosure. The service provider processing computer 132 may include one or more memories 204 (generically referred to herein as memory 204) and one or more processors (processor(s)) 202 configured to execute computer-executable instructions that may be stored in the memory 204. In some embodiments, the service provider processing computer 132 may include one or more buses to facilitate transfers of data between components inside a computer (e.g., between memory devices 204, processors 202, and the like). The one or more buses may be parallel buses or serial buses. The service provider processing computer 132 may be any suitable computing device including, but not limited to, a server computer, a mainframe computer, and so forth. It should be appreciated that functionality described as being supported by the service provider processing computer 132 may, in various embodiments, be supported by a service provider system 130 comprising one or more service provider processing computers 132 and potentially additional software, firmware, and/or hardware components. Further, processing described as being performed or facilitated by the service provider processing computer 132 may, in various embodiments, be performed or facilitated in a distributed fashion by a plurality of service provider processing computers 132.

The processor(s) 202 may include any suitable processing unit capable of accepting digital data as input, processing the input data in accordance with stored computer-executable instructions, and generating output data. The processor(s) 202 may be configured to execute the computer-executable instructions to cause or facilitate the performance of various operations. The processor(s) 202 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 204 may store computer-executable instructions that are loadable and executable by the processor(s) 202 as well as data manipulated and/or generated by the processor(s) 202 during the execution of the computer-executable instructions. The memory 204 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 204 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The service provider processing computer 132 may further include additional data storage 206 such as removable storage and/or non-removable storage including, but not limited to, magnetic storage, optical disk storage, and/or tape storage. Data storage 206 may provide storage of computer-executable instructions and other data. The data storage 206 may include storage that is internal and/or external to the service provider processing computer 132. The memory 204 and/or the data storage 206, removable and/or non-removable, are examples of computer-readable storage media (CRSM).

The memory 204 may store data, computer-executable instructions, applications, and/or various program modules including, for example, one or more operating systems 212, one or more database management systems (DBMS) 214, and/or one or more program modules such as a consumer identifier generation module 216 and a biller account activation module 218. The operating system (O/S) 212 may provide an interface between other applications and/or program modules executable by the service provider processing computer 132 (e.g., consumer identifier generation module 216, a biller account activation module 218, etc.) and hardware resources of the service provider processing computer 132. More specifically, the O/S 212 may include a set of computer-executable instructions for managing hardware resources of the service provider processing computer 132 and for providing common services to other applications and/or program modules (e.g., managing memory allocation among various applications and/or program modules). The O/S 212 may include any operating system now known or which may be developed in the future including, but not limited to, any desktop or laptop operating system, any mobile operating system, any mainframe operating system, or any other proprietary or freely available operating system.

The consumer identifier generation module 216 may include computer-executable instructions that responsive to execution by the processor(s) 202 cause various aspects of processing to generate unique consumer identifiers to be performed in accordance with one or more embodiments of the disclosure. Further, the biller account activation module 218 may include computer-executable instructions that responsive to execution by the processor(s) 202 cause various aspects of biller activation processing (e.g., activate a biller/payee for the consumer responsive to receiving the electronic billing activation request) to be performed.

In some embodiments, the unique consumer identifier may be the subscriber account identifier (e.g., login identifier) while in other embodiments, the unique consumer identifier may be a separate unique identifier different from the subscriber account identifier. Such an identifier may be preferred for security reasons, so that no portion of the login credentials is revealed to another entity to avoid, for example, enabling spurious access to the subscriber account. In some embodiments, where the unique consumer identifier is not the same a login identifier, the unique consumer identifier cannot be used to perform any financial transactional activity on behalf of the consumer and may be used to activate billers or supply data for the association with the consumer.

The unique consumer identifier may not have particular requirements as to length or content, although it may need to be sufficiently long to support a large subscriber base. In some embodiments, the unique consumer identifier may contain a portion that may identify the service provider system 130 (e.g., an initial character or character string or the like).

In some embodiments, more than one unique consumer identifier may be related or grouped together in a "household" relationship. There may be one primary unique consumer identifier and a number of secondary identifiers associated with the primary consumer identifier. Related identifiers may be associated with the same subscriber account, but usable by different individuals. In some embodiments, each of the consumer identifiers may be associated with a different subscriber account.

In some embodiments, the unique consumer identifier may be used to identify a subscriber account and enable delivery of electronic content to the service provider system 130 for association with the subscriber account. Examples of such content may include, but are not limited to, receipts, bill information or images (e.g., images received from non-electronic billers or billers who do not participate in the electronic bill presentment and payment process), warranties, insurance policies, health insurance policies and explanation of benefits, or the like.

In some embodiments, the transmission of the content may be from third-parties that may be given the unique consumer identifier with instructions from the consumer 104 as to the type of content to deliver. Upon receipt of the content, the service provider system 130 may store the content in association with the subscriber account. The service provider system 130 may provide an ability to view the content through an existing or new user interface. The consumer 104 may be provided the ability to organize the content.

In some embodiments, the service provider system 130 may extract data from the content. The service provider system 130 may associated the content with a particular transaction associated with the subscriber account. For example, a receipt may be associated with the transactions that generated the receipt, such as payment of a bill, based at least in part on the data extracted from the receipt, such as a date, amount of the transaction or the like.

In some embodiments, the consumer identifier generation module 216 may optionally facilitate the establishment of a PIN or password associated with the unique consumer identifier. The PIN or password may be generated for one-time or repeated use in association with the unique consumer identifier. The establishment of a PIN or password associated with the unique consumer identifier may provide additional security and/or strengthen authentication.

If a PIN or password is established, the PIN or password may be provided to the consumer 104 in addition to the unique consumer identifier. It may be transmitted for presentation to the consumer 104 with the unique consumer identifier or in a separate communication (e.g., separate email, message, or the like). The biller may request the PIN or password in addition to the unique consumer identifier in order to initiate EBPP services. In some embodiments, the biller may propagate the PIN or password with the unique consumer identifier to the service provider system 130 in an electronic billing activation request. Responsive to receiving the unique consumer identifier and the associated PIN or password from the biller system 140 in the electronic billing activation request, the service provider system 130 may validate the PIN or password after identifying the associated subscriber account and may only continue the activation processing if the PIN or password was determined to be valid.

In some embodiments, even if a PIN or password is generated and associated with a unique consumer identifier, its use may be optional. For example, in some embodiments, the service provider system 130 may facilitate EBPP services even if a PIN or password was not received, despite being generated. If, however, a PIN or password is received, the service provider system 130 may terminate EBPP services or temporarily halt activation of EBPP services if an incorrect PIN or password was received in association with the unique consumer identifier. If the PIN or password is established for one-time use, then there may be a mechanism for the consumer 104 to request a new value to use at a different biller. The service provider system 130 may store the unique consumer identifier in association with the subscriber account associated with the consumer 104. This may enable later retrieval of the value or identification of the appropriate subscriber account.

In some embodiments, for security reasons, the PIN or password may be transmitted via a Web page presented by the service provider system 130 by the consumer 104. In certain situations, to avoid a third party having access to both the unique consumer identifier and the PIN or password, a third party Web page may re-direct the consumer 104 to the service provider system 130 via a Web page operated by or on behalf of the service provider system 130 to allow the consumer 104 to enter the PIN or password. The service provider system 130 may determine whether the PIN or password was entered successfully and transmit the determination back to the third party Web page. If a consumer 104 is in communication with the service provider system 130 when the unique consumer identifier is established, the consumer 104 may be provided the opportunity to choose a value for the PIN or password, which may be captured by a user device 102 and transmitted to the consumer identifier generation module 218 of a service provider processing computer 132. The memory 204 may further include DBMS 204 for accessing, retrieving, storing, and/or manipulating data stored in one or more service provider datastores 134 provided externally to the service provider processing computer 132 and/or one or more internal datastores provided, for example, as part of the data storage 206. The service provider datastore(s) 134 and/or data storage 206 may store any of the data, program modules, and so forth (at least a subset of which may be managed by DBMS 214) depicted as being stored in the memory 204 and/or additional information such as payment information (e.g., pending payments and history), bills (e.g., historic and new), consumer information (e.g., name, address, contact information, etc.), unique consumer identifiers, payee information associated with each of the consumer's payees, including the biller, and further including each biller account at the biller (e.g., electronic billing activation status, biller account number, etc.) and so forth. The DBMS 214 may use any of a variety of database models (e.g., relational model, object model, etc.) and may support any of a variety of query languages. Although not depicted in FIG. 2, it should be appreciated that the memory 204 and/or the data storage 206 may store any number of additional applications, program modules, and/or data.

The service provider processing computer 132 may further include one or more I/O interfaces 208 that facilitate receipt, by the service provider processing computer 132, of information input via one or more I/O devices associated with the service provider processing computer 132 as well as the outputting of information from the service provider processing computer 132 to the one or more I/O devices. The I/O devices may include, but are not limited to, a display, a keypad, a keyboard, a pointing device, a control panel, a touch screen display, a remote control device, a speaker, a microphone, and so forth.

The service provider processing computer 132 may further include one or more network interfaces 210 that may facilitate communication between the service provider processing computer 132 and other components of the networked architecture 100 via one or more of the network(s) 110. For example, the network interface(s) 210 may facilitate interaction between the service provider processing computer 132 and any of the user devices 102, biller processing computers 142, consumer sponsor processing computers 122, and so forth.

FIG. 2 further depicts various illustrative software, hardware, and/or firmware components of an illustrative biller processing computer 142 in accordance with one or more embodiments of the disclosure. The biller processing computer 142 may include one or more memories 222 (generically referred to herein as memory 222) and one or more processors (processor(s)) 220 configured to execute computer-executable instructions that may be stored in the memory 222. In some embodiments, the biller processing computer 142 may include one or more buses to facilitate transfers of data between components inside a computer (e.g., between memory devices 222, processors 220, and the like). The one or more buses may be parallel buses or serial buses. The biller processing computer 142 may be any suitable computing device including, but not limited to, a server computer, a mainframe computer, and so forth. It should be appreciated that functionality described as being supported by the biller processing computer 142 may, in various embodiments, be supported by a biller system 140 comprising one or more biller processing computers 142 and potentially additional software, firmware, and/or hardware components. Further, processing described as being performed or facilitated by the biller processing computer 142 may, in various embodiments, be performed or facilitated in a distributed fashion by a plurality of biller processing computers 142.

The processor(s) 220 may include any suitable processing unit capable of accepting digital data as input, processing the input data in accordance with stored computer-executable instructions, and generating output data. The processor(s) 220 may be configured to execute the computer-executable instructions to cause or facilitate the performance of various operations. The processor(s) 220 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 222 may store computer-executable instructions that are loadable and executable by the processor(s) 220 as well as data manipulated and/or generated by the processor(s) 220 during the execution of the computer-executable instructions. The memory 222 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 222 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The biller processing computer 142 may further include additional data storage 224 such as removable storage and/or non-removable storage including, but not limited to, magnetic storage, optical disk storage, and/or tape storage. Data storage 224 may provide storage of computer-executable instructions and other data. The data storage 224 may include storage that is internal and/or external to the biller processing computer 142. The memory 222 and/or the data storage 224, removable and/or non-removable, are examples of computer-readable storage media (CRSM).

The memory 222 may store data, computer-executable instructions, applications, and/or various program modules including, for example, one or more operating systems 230, one or more DBMS 232, and/or one or more program modules such as a biller account generation module 234 and an electronic billing activation request module 236. The operating system (O/S) 230 may provide an interface between other applications and/or program modules executable by the biller processing computer 142 (e.g., a biller account generation module 234 and an electronic billing activation request module 236, etc.) and hardware resources of the biller processing computer 142. More specifically, the O/S 230 may include a set of computer-executable instructions for managing hardware resources of the biller processing computer 142 and for providing common services to other applications and/or program modules (e.g., managing memory allocation among various applications and/or program modules). The O/S 230 may include any operating system now known or which may be developed in the future including, but not limited to, any desktop or laptop operating system, any mobile operating system, any mainframe operating system, or any other proprietary or freely available operating system.

The biller account generation module 234 may include computer-executable instructions that responsive to execution by the processor(s) 220 cause various aspects of processing to be performed to generate biller accounts associated with consumers 104 in accordance with one or more embodiments of the disclosure. Further, the electronic billing activation request module 236 may include computer-executable instructions that responsive to execution by the processor(s) 220 cause various aspects of biller-initiated electronic billing activation processing to be performed.

The memory 222 may further include DBMS 232 for accessing, retrieving, storing, and/or manipulating data stored in one or more biller system datastores 144 provided externally to the biller processing computer 142 and/or one or more internal datastores provided, for example, as part of the data storage 224. The biller system datastore(s) 144 and/or data storage 224 may store any of the data, program modules, and so forth (at least a subset of which may be managed by DBMS 232) depicted as being stored in the memory 222 and/or additional information such as invoices or bills (e.g., current and historic), consumer information (e.g., name, address, contact information, etc.), unique consumer identifiers, payee information associated with each biller account at the biller (e.g., electronic billing activation status, biller account number, etc.) and so forth. The DBMS 232 may use any of a variety of database models (e.g., relational model, object model, etc.) and may support any of a variety of query languages. Although not depicted in FIG. 2, it should be appreciated that the memory 222 and/or the data storage 224 may store any number of additional applications, program modules, and/or data.

The biller processing computer 142 may further include one or more I/O interfaces 226 that facilitate receipt, by the biller processing computer 142, of information input via one or more I/O devices associated with the biller processing computer 142 as well as the outputting of information from the biller processing computer 142 to the one or more I/O devices. The I/O devices may include, but are not limited to, a display, a keypad, a keyboard, a pointing device, a control panel, a touch screen display, a remote control device, a speaker, a microphone, and so forth.

The biller processing computer 142 may further include one or more network interfaces 228 that may facilitate communication between the biller processing computer 142 and other components of the networked architecture 100 via one or more of the network(s) 110. For example, the network interface(s) 228 may facilitate interaction between the biller processing computer 142 and any of the user devices 102, service provider processing computers 132, and so forth.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted as forming part of any of the components of the architecture 200 are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Illustrative Processes

Figure 3:
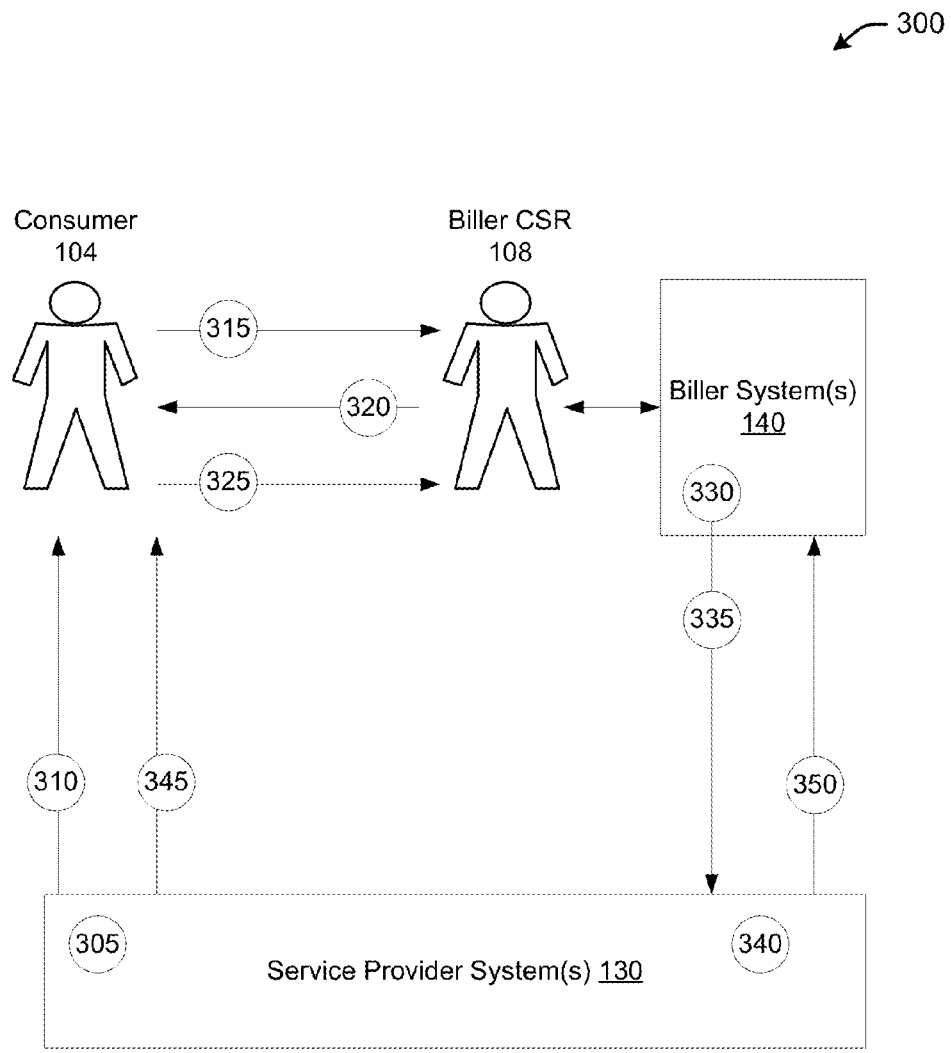
FIG. 3 is a data flow diagram depicting illustrative data flows for biller-initiated electronic billing activation in accordance with an embodiment of the disclosure.

FIG. 3 is a data flow diagram depicting illustrative data flows associated with biller-initiated billing activation in accordance with an embodiment of the disclosure. The data flows may begin at 305 with the service provider system 130 establishing a unique consumer identifier for a consumer 104 in association with a subscriber account. The consumer identifier may be an identifier unique across the scope of all the subscriber accounts associated with the service provider system 130. The unique consumer identifier may be established once for each subscriber account. It may be used by the consumer 104 repeatedly with multiple billers or other entities to direct bills or other content to the service provider system 130 to be associated with the subscriber account associated with the unique consumer identifier.

At 310, the service provider system 130 may transmit a message for presentation to the consumer 104. In some embodiments, the consumer 104 may receive a message via a user application, such as an email application or Short Message Service application. In some embodiments, the consumer 104 may receive a message via a dedicated mobile application associated with the service provider system 130 or a browser-based UI application.

At 315, the consumer 104 may contact a biller system 140 (e.g., biller CSR 108) to establish service (e.g., create a new biller account). In some embodiments, the consumer 104 may call a biller CSR 108 using a telephone. The consumer 104 may establish a communication channel with the biller CSR 108 (using, for example, an instant messaging application) and indicate to the biller CSR 108 that he/she would like to initiate services provided by the biller. At 320, the biller CSR 108 may request information from the consumer 104 to establish a new biller account. The biller CSR 108 may request the information from the consumer 104 over the telephone, or through another established communication channel, such as via an instant messaging application. At 325, the consumer 104 may provide the requested information, including the unique consumer identifier. In some embodiments, the consumer 104 may provide the requested information in conjunction with confirming a willingness to receive bills electronically. For example, the consumer 104 may provide information such as a current address and other identifying information, such as a social security number. The consumer 104 may provide information at 325 via the previously established communication channel (e.g., telephone call, chat windows of an instant messaging application, or the like). In some embodiments, 315, 320, and 325 may be accomplished over a non-real time communication channel, such as an email or messaging system.

In some embodiments, a consumer 104 may provide information to a biller system 140 through a self-service application, browser-based interface, or the like. The consumer 104 may provide information to the biller system 140 without interacting with a biller CSR 108.

At 330, the biller system 140 may create a new biller account associated with the consumer 104 and may generate an electronic billing activation request that includes the unique consumer identifier. At 335, the biller system 140 may transmit the electronic billing activation request to the service provider system 130. In some embodiments, the biller system 140 may automatically transmit the electronic billing activation request to the service provider system 130 responsive to the generation of the electronic billing activation request. In some embodiments, the biller CSR 108 may initiate transmission of the electronic billing activation request to the service provider system 130.

At 340, the service provider system 130 may receive the electronic billing activation request from the biller system 140. The service provider system 130 may extract the unique consumer identifier from the electronic billing activation request and identify a subscriber account associated with the unique consumer identifier. The service provider system 130 may establish the biller as a payee and an electronic biller of the consumer 104. The service provider system 130 may generate a notification of the biller set-up to the consumer 104 and a confirmation to the biller system 140. At 345, the service provider system 130 may transmit the notification of the biller set-up to the consumer 104. At 350, the service provider system 130 may transmit the confirmation of the electronic billing activation to the biller system 140. In some embodiments, the service provider system 130 may optionally permit setting up automatic payments. The electronic billing activation request may include an indication from the consumer to set up automatic payments. The service provider system 130 may set up the automatic payments responsive to receiving the indication in the electronic billing activation request and include confirmation of the automatic payments in the confirmation transmitted to the biller system 140.

Figure 4:
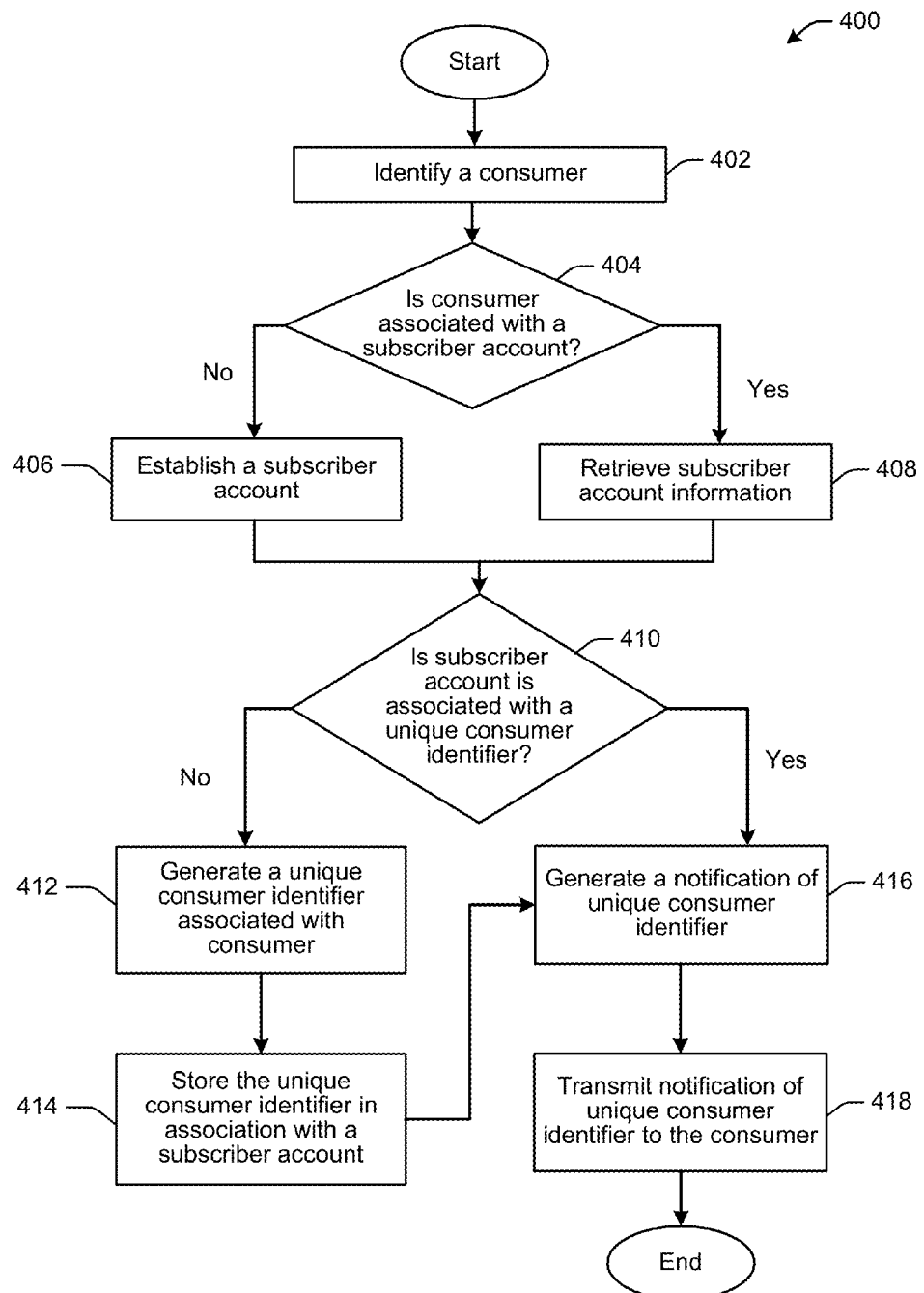
FIG. 4 is a process flow diagram of an illustrative method for generating or identifying a previously generated unique consumer identifier that facilitates biller-initiated electronic billing in accordance with an embodiment of the disclosure.

FIG. 4 is a process flow diagram of an illustrative method 400 for generating or identifying a previously generated unique consumer identifier that facilitates biller-initiated electronic billing in accordance with an embodiment of the disclosure. At block 402, a service provider system 130 may identify a consumer 104. The service provider system 130 may identify one or more consumers 104 through requests received from the consumer 104, from messages sent through a consumer sponsor system 120, from information retrieved from a service provider datastore 134, or the like. In some embodiments, the service provider system 130 may receive a request for enrollment, where enrollment information may be received from a consumer 104. In some embodiments, the consumer 104 may have directly initiated the process by using a user device 102 to contact a service provider system 130 directly. The consumer 104 may have contacted the service provider system 130 through a Web page, a paper enrollment process, an interactive voice response (IVR) system, or the like. In some embodiments, the consumer 104 may have initiated the process to enroll in EBPP services through a consumer sponsor system 120. In some embodiments, the service provider system 130 may receive a transaction request from a consumer 104 who already has a subscriber account established.

At block 404, a determination may be made as to whether an identified consumer 104 is associated with a subscriber account. If the consumer 104 is not associated with a subscriber account, then at block 406, the service provider system 130 may establish a subscriber account for the consumer 104. This may entail generating a new subscriber account and associating the subscriber account with the consumer 104. In some embodiments, the service provider system 130 may request information from a consumer 104 to establish a subscriber account. For example, the service provider system 130 may request contact information or financial information from the consumer 104. In some embodiments, the information necessary to establish a subscriber account may be received from a consumer sponsor system 120. In some embodiments, the information necessary to establish a subscriber account may be received directly from the consumer 104 through one or more communication channels, such as a telephone call, a chat window of an instant messaging application, email, a video chat, or the like. The subscriber account information associated with the consumer 104 may be stored in a service provider datastore 134.

If at block 404, it is determined that the consumer 104 is associated with a subscriber account, then at block 408, the subscriber account information may be retrieved. The subscriber account information may be retrieved from one or more service provider datastores 134. In some embodiments, the subscriber account information may be retrieved using identifying information associated with a consumer 104, such as a name, email address, or phone number. In some embodiments, the consumer 104 may be associated with a subscriber account identifier, which may be used to retrieve or otherwise obtain subscriber account information associated with the consumer 104.

At block 410, a determination may be made as to whether the subscriber account is associated with a unique consumer identifier.

If the subscriber account is not associated with a unique consumer identifier, at block 412, a unique consumer identifier may be generated by a consumer identifier generation module 216 of a service provider processing computer 132. In some embodiments, the consumer identifier generation module 216 may generate the unique consumer identifier based at least in part on a value chosen by the consumer 104. The unique consumer identifier may be unique over the scope of subscriber accounts. In some embodiments, a PIN or password may be generated and associated with the unique consumer identifier. The service provider system 130 may establish a unique consumer identifier for a consumer 104 who has already established a subscriber account but does not yet have a unique consumer identifier. Those consumers 104 who already have established a subscriber account with the service provider system 130 but do not have a unique consumer identifier may be identified through periodic system auditing by the service provider system 130. For example, the service provider system 130 may check the data in the service provider datastore 134 on a monthly basis and check each subscriber account to determine, among other things, if the subscriber account is associated with a unique consumer identifier. Responsive to the generation of a unique consumer identifier, the service provider system 130 may associate the unique consumer identifier with the existing subscriber account associated with the consumer 104. At block 414, the generated unique consumer identifier may be stored in association with the subscriber account associated with the consumer 104. In some embodiments, the unique consumer identifier, as well as any PIN or password that may have been generated and associated with the unique consumer identifier, may be stored in a service provider datastore 134.

If the service provider system 130 determines at block 410 that the subscriber account is associated with a unique consumer identifier or after block 414 where the unique consumer identifier may be stored in association with a subscriber account associated with the consumer 104, at block 416, the service provider system 130 may generate an electronic notification of the unique consumer identifier that is to be transmitted for presentation to the consumer 104. The notification may take one of any of a variety of forms, which may include but are not limited to, a presentation of the value in a Web page or similar user interface presentation, an email message, an SMS text message, a push notification, and/or an automated telephone message.

In some embodiments, the service provider system 130 may determine that the subscriber account is associated with the unique consumer identifier but, based at least in part on a consumer request or other parameter, establish a new second subscriber account associated with the same consumer 104. For example, the new second subscriber account may be established in the context of a different sponsorship. Although the value of the unique consumer identifier may typically be presented as a character string that may be read or heard, other forms of presentation may be used. These may include, but are not limited to, some sort of encoding, such as a bar code, QR code, or the like, that may be read by an appropriate reader/scanner or captured as an image on a user device, thereby reducing the chance of subsequent miskeying. In some cases, the notification may be prepared to be sent via a physical mail process in addition to or instead of an electronic process. The notification may take the form of a card or key ring tag similar to a loyalty program artifact. At block 418, the generated notification that includes the unique consumer identifier may be transmitted for presentation to the consumer 104.

Figure 5:
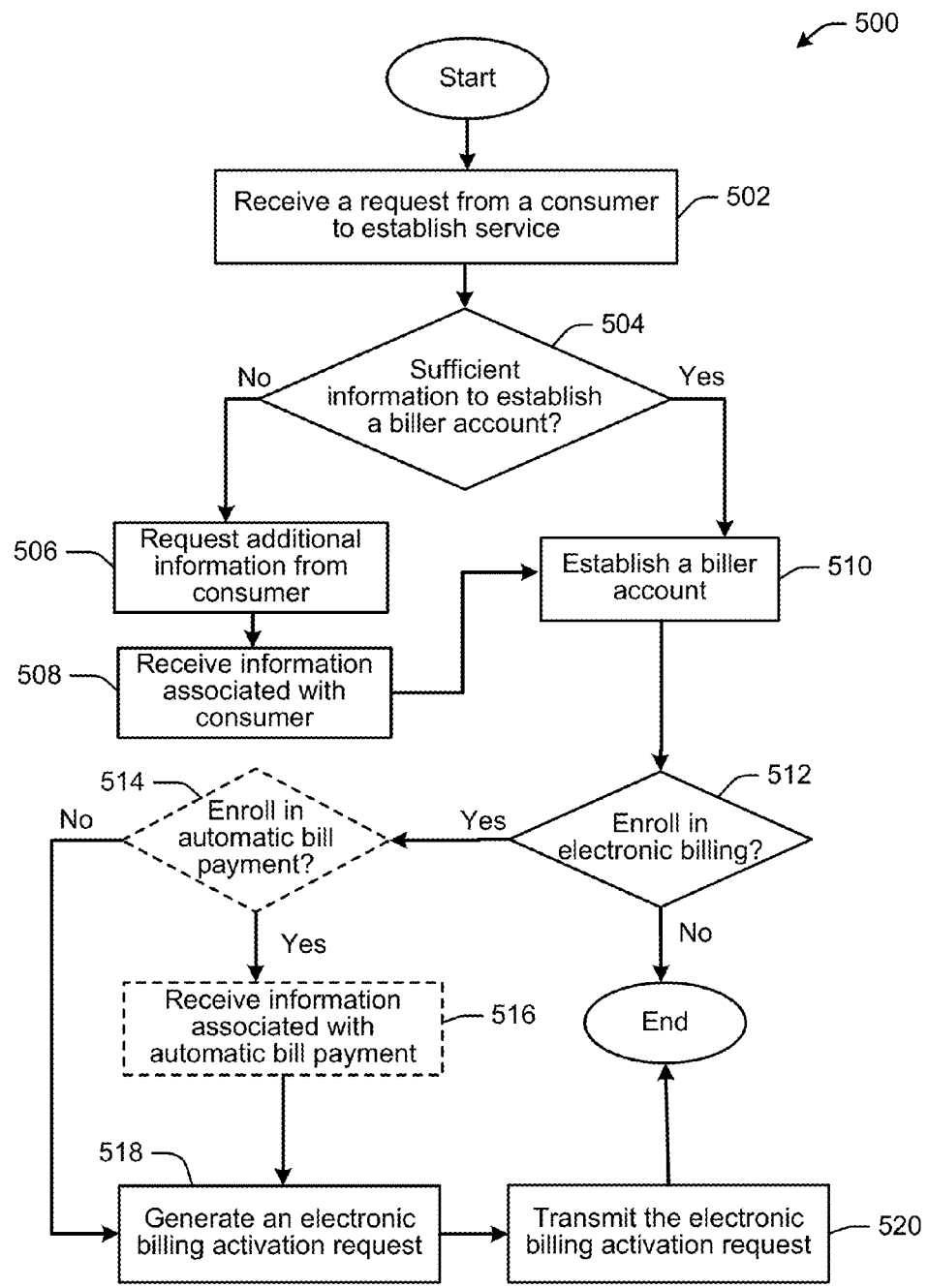
FIG. 5 is a process flow diagram of an illustrative method for initiating biller-initiated electronic billing in accordance with an embodiment of the disclosure.

FIG. 5 is a process flow diagram of an illustrative method 500 for initiating biller-initiated electronic billing in accordance with an embodiment of the disclosure. The method 500 for initiating biller-initiated electronic billing may begin subsequent to the method 400. For example, method 500 may be initiated after a subscriber account has been established at the service provider system 130. At block 502, the biller system 140 may receive a request from a consumer 104 to initiate services provided by the biller. For example, the consumer 104 may initiate a process with a biller to set up a new biller account subsequent to receiving a unique consumer identifier from the service provider system 130. The request from the consumer 104 may be received by the biller in a variety of different channels or forms, which may include, but are not limited to, an automated Web-based application interface, an automated interactive voice response (IVR) telephonic system interface, and/or a biller customer service representative (CSR) 108. A biller CSR 108 may receive a telephone call from the consumer 104 or may call the consumer 104 responsive to receiving a request through any of the above-mentioned channels.

At block 504, the biller system 140 may determine whether there is sufficient information to establish a biller account. In some embodiments, the request received from the consumer 104 may contain at least some information needed by the biller system 140 to establish a biller account. In some embodiments, the biller system 140 may receive information associated with the consumer 104 from a third-party, such as a service provider system 130 or consumer sponsor system 120.

The request to establish service with the biller and set up a new biller account for the consumer 104 may be received through a variety of different mechanisms which may include, but are not limited to, a Web-based enrollment form that includes various fields that may populated with the desired information, a paper enrollment form mailed or given to the consumer 104, an automated (e.g., IVR-based) telephone interaction process soliciting responses for the various fields, and/or a biller CSR 108 conducting a conversation with the consumer to request and receive data corresponding to the various fields.

Information that may be needed to establish a biller account may include the unique consumer identifier established by the service provider system 130. In some embodiments, a request for the unique consumer identifier may be preceded by a request for an indication of whether the consumer 104 would like to enable electronic billing. Electronic billing via the service provider system 130 may be one of several options available for electronic billing, which may include electronic billing through other third-party entities or electronic billing directly from the biller. In some embodiments, the unique consumer identifier may be communicated to a biller CSR 108 verbally or through a self-service application, browser-based interface, or the like. In some embodiments, the consumer 104 may provide the unique consumer identifier by providing a text string or may provide the unique consumer identifier as an image representing an encoding (e.g., bar code or quick response (QR) code).

If at block 504, the biller system 140 determines there is insufficient information to establish a biller account, then at block 506, the biller system 140 may request additional information from the consumer 104. For example, a biller CSR 108 may contact the consumer 104 to request additional information. In some embodiments, the biller system 140 may generate a message to the consumer 104 to create a user account with the biller system 140 and to add information through the user account, such as through a Web page or dedicated client application.

At block 508, the biller system 140 may receive information associated with the consumer 104. For example, a biller CSR 108 may receive the information from the consumer 104 via a telephone call and enter the information into the biller system 140 using a computing device 106. The information received by the biller system 140 may include the unique consumer identifier established by the service provider system 130 and communicated to the consumer 104. In some embodiments, the information may be received in an automated form directly from the consumer 104 (e.g., in the case of the consumer using a Web-based enrollment application, an IVR-based system, or similar), or may be the result of biller data entry (e.g., by a biller CSR 108 using a computing device 106) or data conversion (e.g., scanning and data extraction) of information received by the biller in a form that cannot be immediately automatically processed (e.g., paper form, aural form, fax or image form, or the like).

If at block 504, it is determined by the biller system 140 that there is sufficient information received from the request or other source or when information is received at block 508, then at block 510, a biller account may be established and associated with the consumer 104. The biller system 140 may perform some validation and/or approval processing (e.g., the latter may be in the context of a credit request or loan application) on the consumer-supplied information. In some embodiments, the biller system 140 may analyze the consumer-supplied information to determine whether to approve the generation or establishment of the biller account. Responsive to verification of the information supplied by the consumer 104, the biller system 140 may create a new biller account for the consumer. In creating a new biller account, the biller system 140 may generate a biller account number by which the consumer 104 will be known to the biller (e.g., for that particular account). A data structure for the new biller account may include information about the consumer 104 (e.g., including the unique consumer identifier provided by the service provider system 130), the new biller account number, service parameters, and possibly additional retrieved information or results of validation or approval processing may be created and stored for future use. In some embodiments, the biller may also receive automatic payment instructions and parameters from the consumer 104, which are discussed below.

Based on the information received in the request from the consumer 104 at block 502 or from information received at block 508, at block 512, a determination may be made by the biller system 140 as to whether the consumer 104 should be enrolled in electronic billing. For example, either in the request received from the consumer 104 or from additional information received from the consumer 104, the biller system 140 may identify an indication from the consumer 104 that he/she wishes to enroll in electronic billing. If the consumer 104 has indicated a desire not to enroll in electronic billing, then the process may end.

In some embodiments, the provision of the unique consumer identifier in response to an electronic billing inquiry made by the biller system 140 may indicate that the consumer elected to enable electronic billing. In some embodiments, the consumer 104 may provide an explicit indication in the request to establish service or as a response to the request for additional information that they wish to enable electronic billing.

At block 514, a determination may optionally be made as to whether the consumer 104 wishes to enroll in automatic bill payment. If the user does not wish to enroll in automatic bill payment, processing continues with block 518. Otherwise, at block 516 the biller system 140 may optionally request additional information from the consumer 104 regarding establishing automatic bill payments. For example, a biller CSR 108 may request a variety of control parameters. The information received from the consumer 104, either from the request to establish service or additional information received from the consumer 104, may be included in the electronic billing activation request requesting activation of automatic bill payment. For example, the information received from the request or the consumer 104 may indicate different parameters for automatic bill payment, such as the amount to be paid (e.g., minimum payment, total amount, total amount up to a threshold), timing of the payment (e.g., on due date, a certain number of days prior to the due date, etc.), or duration of the automatic bill payments (e.g., no end date, designated amount of time, for example, six months, or the like).

At block 518, the biller system 140 may generate an electronic billing activation request based at least in part on the unique consumer identifier associated with the consumer. The electronic billing activation request may be formatted for the service provider system 130. In some embodiments, the electronic billing activation request may require the biller to identify the service provider system 130 from multiple potential endpoints based on the unique consumer identifier. A portion of the unique consumer identifier may identify the endpoint. Alternatively, the biller system 140 may compare the unique consumer identifier with data stored in a local data repository, which may be periodically updated to contain information corresponding to various endpoints) or access one or more external services (e.g., via a Web service) to determine a correct endpoint. When the correct endpoint is identified, the biller system 140 may obtain or request further information associated with the endpoint to determine the particular information to transmit, one or more transaction formats, and preferences or protocols for transmitting the information.

In some embodiments, the information included in the electronic billing activation request may include, but is not limited to, an identification of the biller (as known by the service provider system 130), the unique consumer identifier, and/or an identification of the biller account established and associated with the consumer 104 (e.g., biller account number).

Other information may include: information associated with the consumer 104 as known by the biller system 140 (e.g., name, address, etc.), billing cycle start date, billing cycle frequency, or automatic bill payment instructions and/or parameters.

At block 520, the biller system 140 may transmit the electronic billing activation request to the service provider system 130. In some embodiments, the biller system 140 may transmit the electronic billing activation request over one or more secure networks. In some embodiments, the biller system 140 may update a data repository accessible by both the biller system 140 and the service provider system 130 and transmit a message to the service provider system 130 that a change has been made to the repository. In some embodiments, communications between the various entities (e.g., the biller system 140, the service provider system 130, etc.) may be either synchronous or asynchronous. Synchronous communications may have active entities that exchange data, such as requests and/or responses, immediately, whereas asynchronous systems may include processing at one end that is delayed with respect to another system. Web services or other types of request-response processing may be an example of synchronous processing. An example of asynchronous processing may include one-at-a-time processing over, for example, a messaging queue or batch processing, where a number of requests or response are combined together in a "batch" or file and transmitting the file from one system to another.

Figure 6:
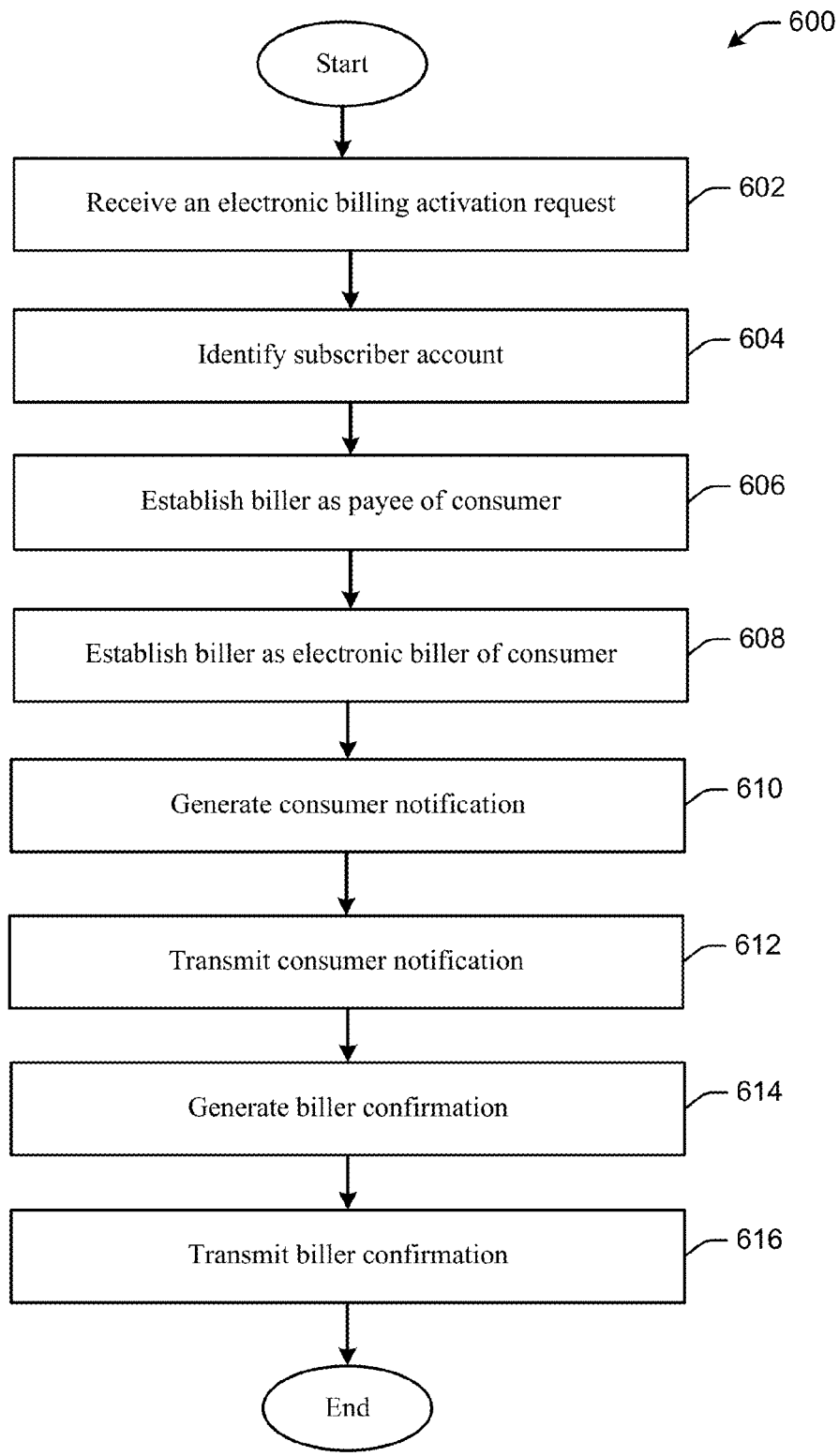
FIG. 6 is a process flow diagram of an illustrative method for activating biller-initiated electronic billing in accordance with an embodiment of the disclosure.

FIG. 6 is a process flow diagram of an illustrative method 600 for responding to a biller-initiated electronic billing activation request in accordance with an embodiment of the disclosure. At block 602, the service provider system 130 may receive the electronic billing activation request generated by the biller system 140 in association with method 500.

At block 604, the service provider system 130 may identify a subscriber account. In some embodiments, the service provider system 130 may extract or use information from the electronic billing activation request to identify the subscriber account. For example, the service provider system 130 may extract the unique consumer identifier from the electronic billing activation request and may query the service provider datastore 134 and/or data storage 206 of the service provider processing computer 132 to identify a subscriber account associated with the unique consumer identifier. If additional consumer information is received, the service provider system 130 may use the information to confirm and/or verify the identification of the consumer 104.

At block 606, the service provider system 130 may establish the biller that transmitted the electronic billing activation request as a payee of the identified consumer 104. For example, the biller account activation module 218 may identify the subscriber account associated with the identified consumer 104 and modify or add data to the subscriber information indicating that the biller is a payee of the consumer 104. In some embodiments, the biller account activation module 218 may create a new payee corresponding to the biller account identified by the electronic billing activation request (e.g., a combination of the biller identifier and the biller account number) in a payee list of the consumer 104 associated with the subscriber account. The payee may identify the biller and the biller account.

At block 608, the service provider system 130 may establish the biller as an electronic biller of the consumer. This may involve setting an indicator associated with the appropriate payee in the payee list. If the electronic billing activation request further includes automatic payment instructions and/or parameters, the service provider system 130 may validate the information and activate automatic payment of future received electronic bills in accordance with the instructions/parameters.

At block 610, the service provider system 130 may generate one or more notification(s) of the addition of the biller as a new payee and electronic biller of the consumer 104. In some embodiments, the one or more notification(s) may indicate the associated establishment of automatic payments for the biller. The notification(s) may be electronic (e.g., a visual presentation in a user interface during a subsequent log-in by the consumer 104 into the website or system, an email, an SMS text message, a push notification, an automated telephone message) or non-electronic or non-automated (e.g., a paper mailing or a human telephone call). More than one notification mechanism may be used. Consumer profile information and/or preferences associated with the subscriber account may be examined to determine the appropriate mechanism(s).

At block 612, the service provider system 130 may transmit the one or more notification(s) for presentation to the consumer 104. In some embodiments, the activity may be logged in the service provider datastore 134, in association with the consumer data (e.g., subscriber account).

At block 614, the service provider system 130 may generate a confirmation of the activation of electronic billing in response to the electronic billing activation request, to be transmitted to the biller. At block 616, the service provider system 130 may transmit the generated confirmation to the biller system 140.

In some embodiments, after the electronic billing activation processing, electronic billing and payment may proceed normally, as it would following consumer-initiated electronic billing activation. The biller may generate electronic billing information for the consumer 104 at the next billing cycle date and transmit at least a portion of the electronic billing information to the service provider system 130. The transmitted electronic billing information may include an identification of the biller and an identification of the biller account associated with the consumer 104 (e.g., the biller account number). Based upon the biller account number, the service provider system 130 may associate the newly received electronic billing information with the appropriate subscriber account.

The service provider system 130 may take appropriate action, in accordance with pre-established parameters, to notify the consumer 104 of the newly received electronic billing information, transform newly received electronic billing information for presentation, present newly received electronic billing information, and/or automatically pay the bill associated with the newly received electronic billing information, as appropriate. If the bill is not automatically paid, the service provider system 130 may support payment of the bill upon receiving a consumer 104 request to do so. The service provider system 130 may accept payment from the consumer 104 in association with the electronic bill and transmit the funds to the biller.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine when executing the computer-executable program instructions. The computer, processor, or other programmable data processing apparatus so loaded with computer-executable program instructions and executing the computer-executable program instructions becomes a means for implementing one or more functions specified in the previously described flow diagram block or blocks. These computer-executable program instructions may also be stored in one or more non-transient computer-readable storage media or memories that can direct a computer or other programmable data processing apparatus to function in a particular manner in accordance with one or more functions specified in the previously described flow diagram block or blocks. Such computer-readable storage media may constitute an article of manufacture. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one network interface configured to:
      receive, by a biller system associated with a biller, entity information associated with an entity requesting to establish a biller account with the biller system,
         wherein the entity information comprises an identifier associated with a subscriber account at an electronic bill presentment and payment (EBPP) service provider, and
         wherein the subscriber account is associated with the entity;
      transmit, by the biller system to an EBPP service provider system, an electronic billing activation request, and
      receive, by the biller system from the EBPP service provider system, a confirmation of processing of the electronic billing activation request;
   at least one memory storing computer-executable instructions; and
   at least one processor configured to access the at least one memory and to execute the computer-executable instructions to:
      generate a first data structure corresponding to the biller account based at least in part on the received entity information;
      identify the EBPP service provider system to which the electronic billing activation request is to be transmitted, wherein at least a part of the identifier associated with the subscriber account identifies the EBPP service provider system;
      determine a format of the electronic billing activation request and a transmission protocol for the electronic billing activation request based on the identified EBPP service provider system;
      generate the electronic billing activation request in accordance with the determined format, wherein (a) generating the electronic billing activation request comprises generating a second data structure based at least in part on the determined format and the first data structure and (b) the electronic billing activation request comprises i) an identifier associated with the biller, ii) the identifier associated with the subscriber account, and iii) an identifier associated with the biller account; and
      direct the at least one network interface to transmit the electronic billing activation request to the EBPP service provider system associated with the EBPP service provider in accordance with the transmission protocol, wherein the electronic billing activation request enables the EBPP service provider system to establish the biller as at least one of i) a new payee associated with the subscriber account or ii) a new electronic biller associated with the subscriber account.

2. The system of claim 1, wherein the entity is one of:
   i) an individual, or
   ii) a business.

3. The system of claim 1, wherein the at least one network interface is further configured to:
  receive a request to initiate processing to generate the biller account.

4. The system of claim 1, wherein the at least one processor is further configured to:
  direct the at least one network interface to transmit, for presentation to the entity, a request for the entity information responsive to receiving the request to initiate processing to generate the biller account, and
  the at least one network interface is further configured to transmit, for presentation to the entity, the request for the entity information response.

5. The system of claim 1, wherein the at least one processor is further configured to perform at least one of:
  validate at least a portion of the entity information; or
  analyze at least a portion of the entity information to approve generating the biller account.

6. The system of claim 1, wherein the at least one processor is further configured to:
  generate the identifier associated with the biller account.

7. The system of claim 1, wherein the at least one processor is further configured to:
  store the entity information in association with the identifier associated with the biller account.

8. The system of claim 1, where the entity information further comprises an automated payment request.

9. The system of claim 8, wherein the electronic billing activation request further comprises an automated payment instruction corresponding to the automated payment request, wherein the automated payment instruction enables the EBPP service provider system to activate automatic payment of future bills of the biller for the biller account.

10. A computer-implemented method, comprising:
  receiving, by a biller system associated with a biller and comprising one or more computers, entity information associated with an entity requesting to establish a biller account with the biller system, wherein (a) the entity information comprises an identifier associated with a subscriber account at an electronic bill presentment and payment (EBPP) service provider, and (b) the subscriber account is associated with the entity;
  generating, by the biller system, a first data structure corresponding to the biller account based at least in part on the received entity information;
  identifying an EBPP service provider system to which the electronic billing activation request is to be transmitted, wherein at least a part of the identifier associated with the subscriber account identifies the EBPP service provider system;
  determining a format of the electronic billing activation request and a transmission protocol for the electronic billing activation request based on the identified EBPP service provider system;
  generating, by the biller system, an electronic billing activation request in accordance with the determined format, wherein (a) generating the electronic billing activation request comprises generating a second data structure based at least in part on the determined format and the first data structure and (b) the electronic billing activation request comprises i) an identifier associated with the biller, ii) the identifier associated with the subscriber account, and iii) an identifier associated with the biller account;
  transmitting, by the biller system, the electronic billing activation request to the EBPP service provider system associated with the EBPP service provider in accordance with the transmission protocol, the electronic billing activation request; and
  receiving, by the biller system from the EBPP service provider system, a confirmation of processing of the electronic billing activation request, wherein the electronic billing activation request enables the EBPP service provider system to establish the biller as at least one of i) a new payee associated with the subscriber account or ii) a new electronic biller associated with the subscriber account.

11. The computer-implemented method of claim 10, wherein the entity is one of:
  i) an individual, or
  ii) a business.

12. The computer-implemented method of claim 10, further comprising:
  receiving, by the biller system, a request to initiate processing to generate the biller account.

13. The computer-implemented method of claim 10, further comprising:
  transmitting, by the biller system for presentation to the entity, a request for the entity information responsive to receiving the request to initiate processing to generate the biller account.

14. The computer-implemented method of claim 10, wherein generating the biller account comprises at least one of:
  validating, by the biller system, at least a portion of the entity information; or
  analyzing, by the biller system, at least a portion of the entity information to approve generating the biller account.

15. The computer-implemented method of claim 10, further comprising:
  generating, by the biller system, the identifier associated with the biller account.

16. The computer-implemented method of claim 10, further comprising:
  storing the entity information in association with the identifier associated with the biller account.

17. The computer-implemented method of claim 10, where the entity information further comprises an automated payment request.

18. The computer-implemented method of claim 17, wherein the electronic billing activation request further comprises an automated payment instruction corresponding to the automated payment request, wherein the automated payment instruction enables the EBPP service provider system to activate automatic payment of future bills of the biller for the biller account.

* * * * *